(12) United States Patent
Borman et al.

(10) Patent No.: US 7,660,399 B2
(45) Date of Patent: Feb. 9, 2010

(54) VOICE PROCESSING SYSTEM

(75) Inventors: Samuel David Borman, Southsea (GB); David Seager Renshaw, Winchester (GB); Yuk-Lun Wong, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 959 days.

(21) Appl. No.: 10/818,837

(22) Filed: Apr. 6, 2004

(65) Prior Publication Data

US 2004/0190690 A1    Sep. 30, 2004

Related U.S. Application Data

(62) Division of application No. 09/221,018, filed on Dec. 23, 1998, now Pat. No. 6,748,055.

(30) Foreign Application Priority Data

Jun. 9, 1998    (GB) ................................. 9812361.5

(51) Int. Cl.
*H04M 11/00* (2006.01)
(52) U.S. Cl. ................. 379/88.16; 379/88.14
(58) Field of Classification Search .................. None
See application file for complete search history.

(56) References Cited

U.S. PATENT DOCUMENTS 5,412,712 A * 5/1995 Jennings ................... 379/88.05

(Continued)

FOREIGN PATENT DOCUMENTS

EP    0658855    6/1995

(Continued)

OTHER PUBLICATIONS

"Portable Application in Current Computing", J. Janecek, Informtion Technology Applications in Biomedicine, 1997, ITAB '97, Proceedings of the IEEE Engineering in Medicine and Biology Society Region 8 International Conference Prague, Czech Republick Sept. 7-9, 1997, pp. 104-105.

(Continued)

*Primary Examiner*—Curtis Kuntz
*Assistant Examiner*—Joseph T Phan
(74) *Attorney, Agent, or Firm*—George R. McGuire; David B. Wyocehowsky; Bond, Schoeneck & King, PLLC

(57) ABSTRACT

A voice processing complex has a plurality of host machines, each host machine supporting one or more voice applications, at least one host in the complex including telephony hardware for providing access to a plurality of telephone lines. Such a host provides telephony functions to the complex. This is achieved by maintaining a mapping of voice applications to telephone lines, and creating a call object in response to an incoming call on one of the lines. It is then determined which voice application to associate with the incoming call on the basis of this mapping, and an identifier to the call object is then passed to the determined voice application. Thereafter the call object is responsive to requests from this voice application for providing telephony functions for the call. This includes receiving a media object from the voice processing application which represents desired output over a telephone line. This media object is then processed into a plurality of output components in accordance with one or more presentation criteria, and these components are then output over the telephone line.

8 Claims, 4 Drawing Sheets

U.S. PATENT DOCUMENTS

| | | | | |
|---|---|---|---|---|
| 5,440,615 | A | * | 8/1995 | Caccuro et al. ........... 379/88.06 |
| 5,452,341 | A | * | 9/1995 | Sattar ...................... 379/88.27 |
| 5,481,589 | A | * | 1/1996 | Morduch ..................... 379/52 |
| 5,493,606 | A | | 2/1996 | Osder et al. ................... 379/67 |
| 5,644,631 | A | * | 7/1997 | Sattar et al. ............ 379/201.05 |
| 5,717,747 | A | * | 2/1998 | Boyle et al. ............ 379/201.03 |
| 5,724,406 | A | * | 3/1998 | Juster ...................... 379/88.13 |
| 5,794,039 | A | * | 8/1998 | Guck .................... 707/103 R |
| 5,963,618 | A | * | 10/1999 | Porter .................... 704/270.1 |
| 6,002,756 | A | * | 12/1999 | Lo et al. ................ 379/201.03 |
| 6,046,985 | A | * | 4/2000 | Aldred et al. ............. 370/252 |
| 6,052,367 | A | * | 4/2000 | Bowater et al. ............ 370/352 |
| 6,134,313 | A | * | 10/2000 | Dorfman et al. ....... 379/201.01 |
| 6,141,724 | A | * | 10/2000 | Butler et al. ................. 717/107 |
| 6,181,781 | B1 | * | 1/2001 | Porter et al. ............. 379/88.17 |
| 6,282,270 | B1 | * | 8/2001 | Porter .................... 379/88.17 |
| 6,335,964 | B1 | * | 1/2002 | Bowater et al. .......... 379/88.16 |
| 6,597,776 | B1 | * | 7/2003 | Walker et al. .......... 379/114.26 |
| 2005/0111635 | A1 | * | 5/2005 | Caputo et al. ............ 379/88.22 |

FOREIGN PATENT DOCUMENTS

| | | | |
|---|---|---|---|
| EP | 658855 | A1 * | 6/1995 |
| EP | 0722240 | | 7/1996 |
| GB | 2325112 | | 11/1998 |

OTHER PUBLICATIONS

"A Walking tour of JavaBeans", M. Johnson, Java World, Aug. 1997, Rerieved from the Internet: URL: HTTP://WWW.JAVAWORLD.COM/JAVAWORLD/JW-08-1997/JW-08-BEANS_P.HTML>.

"Object Oriented Reuse: Experience in Developing a Framework for Speech Recognition Applications", S. Srinivasan et al., Software Engineering, 1998. Proceedings of the 1998 international Conference on Dyoto, Japan Apr. 19-25, 1998, Los Alamitos, CA, USA, IEEE Comput. Soc, US, Apr. 19, 1998, pp. 322-330.

"An Object-Oriented Approach to Dialogue Management in Spoken Language Systems", Sparks et al., Human Factors in Computing Systems Conference Proceedings, Reading, US, Apr. 24, 1994 pp. 211-217.

Syntellect Press Release—May 12, 1998.

* cited by examiner

VOICE PROCESSING SYSTEM

This application is a Divisional of prior application Ser. No. 09/221,018 (now U.S. Pat. No. 6,748,055) filed Dec. 23, 1998, which claims priority back to UK application 9812361.5 filed Jun. 9, 1998.

BACKGROUND OF THE INVENTION

The present invention relates to voice processing systems for supporting one or more voice processing applications.

Voice processing systems are widely used in call centres and other environments to manage interactions with customers, thereby reducing the number of relatively expensive human agents required to service customer inquiries, whilst at the same time providing improved responsiveness for callers. The vast majority of voice processing applications developed for use in such situations are still based primarily on a relatively simple set of operations, including playing the caller a prompt (typically a question, perhaps asking them to specify the particular service in which they are interested), receiving a dual tone multiple frequency (DTMF) key input from the caller in response to such prompt, and then performing some action in response to the caller selection. Examples of possible actions include playing a prompt to obtain further DTMF input, recording a voice message from the caller, transferring the caller to another extension, or playing some information to the caller, such as an account balance, or timetable information (this may require the voice processing system to interact with a separate computer database). The prompts and other information played out in audio form to callers typically comprise one or more pre-recorded audio segments which can be assembled together as required.

It will be appreciated that an enormous range of voice processing applications have been developed in the industry, both inbound and outbound. One problem with traditional voice processing systems is that they have often each provided their own specific voice application environment. This has had several unfortunate consequences, for example it is difficult to port voice applications from one voice processing system to another, whilst at the same time few voice processing systems are properly scalable across the whole range of potential operation (from handling a few lines up to several hundred). Thus a user having a heterogeneous system environment is prevented from flexibly deploying a single voice processing application across all machines.

The provision of a specialised voice application environment also makes voice processing applications difficult to integrate with general computing business systems in an organisation, and in addition voice processing applications are often harder and more expensive to develop (since programmers must learn about the specialised environment). These problems are becoming ever more acute with the rapidly increasing the number of voice processing systems employed in customer situations, and the need to provide good integration between the voice processing applications and the overall management information systems.

United Kingdom patent application 9719942.6, filed 19 Sep. 1997, describes a voice processing application environment, based on the object-oriented (OO) Java programming language. In particular, this document describes the provision of a set of telephony Java Beans (ie programming components) which can be readily integrated using standard Java program development tools into general business applications to provide straightforward access to telephony functionality on any platform. A Java-based voice processing architecture has also been announced by Syntellect Inc (see http://www.syntellect.com/vista.htm). EP-A 658855 discloses the integration of a multimedia facility within an objected oriented environment, whereby selection of an object by a user of an audio view can result in output for example using a text to speech facility.

An important feature of the above-mentioned UK patent application is the ability to render details of the voice processing system effectively transparent to the application, thereby providing full platform independence. It is difficult to provide an efficient interface between the application and the telephony system in order to allow the application access to telephone functionality, without building into the application some knowledge of the underlying voice processing system, and thereby compromising flexibility. One particular complication for example involves playing a prompt, due to the variations in the way that certain information such as dates and times are handled in such situations.

SUMMARY OF THE INVENTION

Accordingly, the present invention provides a voice processing system for connection to at least one telephone line for providing telephony support to one or more voice processing applications, comprising:

means for receiving a media object from a voice processing application, said media object representing desired output over a telephone line;

means for processing said media object into a set of a plurality of output components in accordance with one or more presentation criteria; and means for outputting said output components over the telephone line.

In the preferred embodiment, said output components comprise individual voice segments, and said means for processing said media object into a set of a plurality of output components includes means for generating a set of voice segments for said media object in accordance with one or more presentation criteria.

The presentation criteria can generally be specified by said voice processing application, determined automatically by the voice processing system (typically using default values), or some combination of the two. Examples of presentation criteria include the locale and a presentation style.

Such an approach provides great flexibility, in that there is no need to hard code information such as locale or presentation style into the application, but instead these can be provided by the default telephony environment. This allows applications to be developed without needing to know in advance the countries or languages in which they will be deployed. Moreover, the ability to override the default settings is valuable for example where one voice processing system is running the essentially the same application in two different languages, potentially accessible from two different countries.

The invention further provides a method of operating a voice processing system for connection to at least one telephone line for providing telephony support to one or more voice processing applications, said method comprising the steps of:

receiving a media object from a voice processing application, said media object representing desired output over a telephone line;

processing said media object into a set of a plurality of output components in accordance with one or more presentation criteria; and outputting said output components over the telephone line.

In the preferred embodiment, said media object is received via remote method invocation in serialised form, thereby allowing the voice application to reside on a different machine than the voice processing system.

The invention also provides a voice processing complex comprising a plurality of host machines, each host machine supporting one or more voice applications, at least one host in the complex including telephony hardware for providing access to a plurality of telephone lines, said at least one host including:

means for maintaining a mapping of voice applications to telephone lines;

means for creating a call object in response to an incoming call on one of said plurality of telephone lines;

means for determining a voice application to be associated with said incoming call on the basis of said mapping of voice applications to telephone lines;

means for providing an identifier for said call object to the determined voice application; and means in said call object responsive to requests from said determined voice application for providing telephony functions to said incoming call.

In the preferred embodiment the determined voice application is on a different host from the call object, and accesses the call object via remote method invocation. Applications which are currently available to receive an incoming call, register themselves with the voice processing means; if there is an incoming call on a telephone line for which no application is registered, then a default application is launched.

The invention further provides a voice processing system for supporting one or more voice applications, said voice processing system including:

telephony hardware for providing access to a plurality of telephone lines;

means for maintaining a mapping of voice applications to telephone lines;

means for creating a call object in response to an incoming call on one of said plurality of telephone lines;

means for determining a voice application to be associated with said incoming call on the basis of said mapping of voice applications to telephone lines;

means for providing an identifier for said call object to the determined voice application;

means in said call object for receiving a media object from said determined voice processing application, said media object representing desired output over said one telephone line;

means for processing said media object into a set of a plurality of output components in accordance with one or more presentation criteria; and means for outputting said output components over said one telephone line.

The invention further provides a voice processing system for connection to at least one telephone line for providing telephony functionality to one or more voice processing applications, said voice processing system comprising:

first application manager means for launching a first voice processing application when the voice processing system in initialised, said application manager means providing access to said telephony function for said first voice processing application; and second application manager means which is launched responsive to a request by a second voice processing application for access to said telephony function.

Thus one of the difficulties when trying to separate the application from specifics of the telephony functionality is in supplying information about the actual telephony environment into a generic application. In the preferred embodiment, this is achieved by supplying configuration information to an application manager when the system is initialised, which can then be made available to the application. This is satisfactory for applications which are effectively subservient to the voice processing environment, but ill-suited to certain applications for example where the telephony is only a minor part of such applications, or perhaps only required on an intermittent basis. Thus the voice processing architecture of the present invention also allows such applications to create their own application manager (note that in this case the application must provide its own information about the telephony resource to use, since this will not have been provided as part of the initial configuration). In the preferred embodiment, this is achieved by making said first and second voice processing applications obtain access to telephone functionality through a static interface into an application manager.

BRIEF DESCRIPTION OF THE DRAWINGS

A preferred embodiment of the invention will now be described in detail by way of example only with reference to the following drawings.

DETAILED DESCRIPTION

Figure 1:
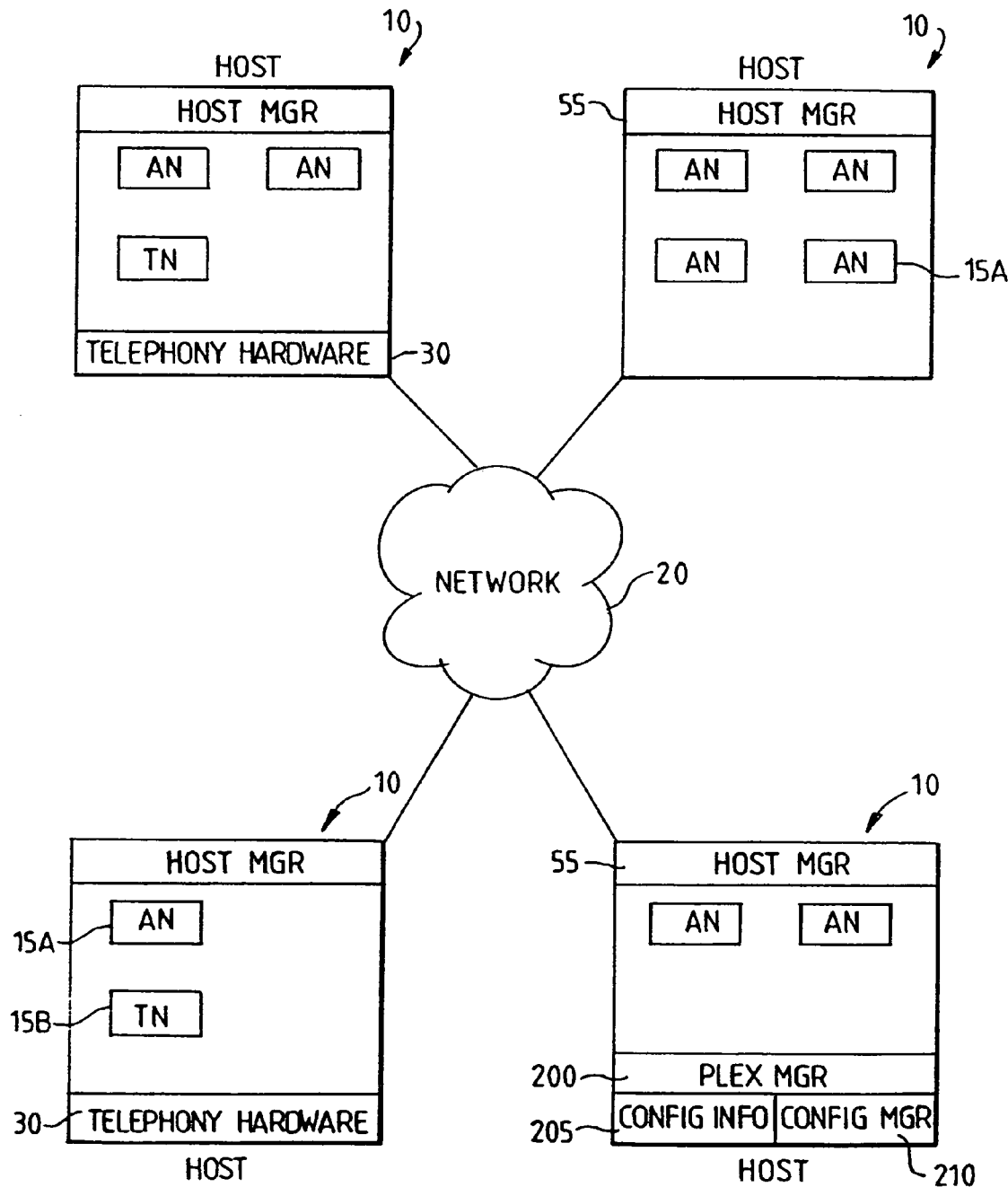
FIG. 1 illustrates the overall architecture of a voice processing complex.

FIG. 1 illustrates the overall architecture of a voice processing complex (termed a "plex"), which comprises one or more hosts 10 connected by a network 20. Each host can typically be regarded as a single workstation, whilst the network can be any suitable form of network, such as a local area network (LAN), a wide area network (WAN), etc. In the preferred embodiment, communications over network 20 use the well-known TCP/IP protocol, which underlies the Internet and many intranets, extranets, etc, and is widely supported by most operating systems. It will be appreciated that host machines 10 may therefore be located as desired, potentially in the same room as one another, or perhaps spread across different continents.

Each host supports one or more nodes 15. There are two forms of nodes, Application Nodes (AN) 15A, which essentially define and control voice processing applications, and Telephony Nodes (TN) 15B, which provide telephony services to the application nodes. Note that an application node essentially provides a subset of the services provided by a telephony node, in that a telephony node can also support applications and therefore function itself as an application node (but only a telephone node can provide telephony services).

Figure 2:
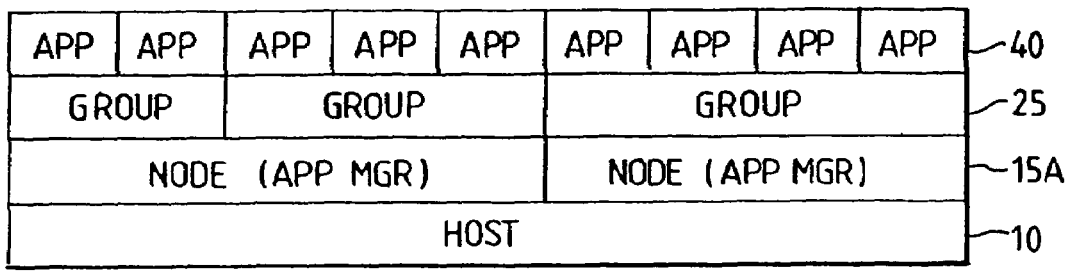
FIG. 2 illustrates the structure of host, node, group and application in the complex of FIG. 1.

Each application node runs an application manager for supporting one or more applications, which can be collected into groups. This is illustrated in FIG. 2, where (by way of example only) there is a host 10 which runs two application nodes 15A. The first application node supports two groups 25, which in turn include two and three applications 40 respectively. The second application node supports one group, which in turn includes four applications. Note that a group can include multiple copies of the same application. Groups provide an easy mechanism for controlling multiple applications, in particular, for launching multiple applications together at initialisation time. In addition, it is also possible for a node to support an application that is not included in a group, as will be discussed in more detail below.

Figure 3:
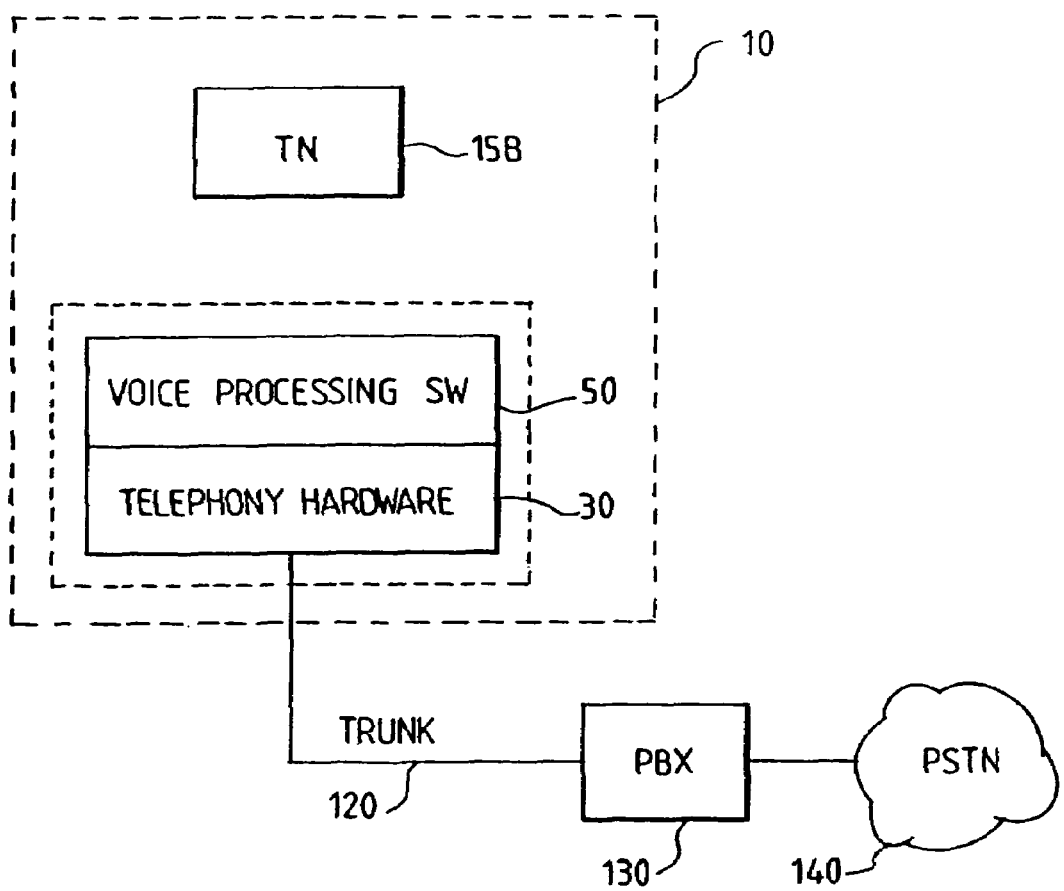
FIG. 3 illustrates the provision of telephony support into the voice processing complex of FIG. 1.

FIG. 3 illustrates the structure of a host 10 that includes telephony hardware 30. This is used to interface to a telephone trunk line 120, which in turn is connected into the public switched telephone network (PSTN) 140 via private branch exchange (PBX) 130 (alternatively the telephony hardware 30 may connect directly to the PSTN 140). The trunk line 120 may be either digital (typically one or more T1/E1 connections) or analog, supporting from just a few telephony channels, to a hundred or more channels. The telephony hardware is controlled by voice processing software 50, which is directed by telephony node 15B.

In the preferred embodiment, one implementation of the system illustrated in FIG. 3 uses the commercially available IBM DirectTalk/2 software product for the VRU software 50, as described in the manual "DirectTalk/2 General Information and Planning v2.1" (ref GB35-4403-04), and the other manuals listed therein. In this case, the host system 10 comprises an IBM Personal Computer running the IBM OS/2 Warp v4 operating system, and the telephony hardware can be one of a wide selection of cards available from Dialogic Corporation (eg D/41, D/81—see the above referenced manual for full details). Another implementation of the system of FIG. 3 uses a slightly modified version of the IBM DirectTalk for AIX v2.1 software product for the VRU software as described in the manual "DirectTalk for AIX General Information and Planning v2.1" (ref GC33-1840-00) and the other manuals listed therein. In this case the host system 10 comprises an RS/6000 workstation running the IBM AIX v4.2 operating system, and the telephony hardware 30 comprises a digital trunk adapter in the RS/6000 workstation which is linked to an external digital trunk processor (9295), which in turn is connected to trunk 120 (this hardware is available from IBM, and is described in more detail in the above referenced manual).

Returning to FIG. 1, each host also includes a host manager 55. In addition, there is a single plex manager 200, for controlling overall operation of the plex, based on stored configuration information 205. A configuration manager 210 is also provided to insert/update/delete the configuration information 205 as desired. Note that although the plex manager is shown as being located on a host system in the plex, this is not actually necessary, and instead the plex manager may be located on yet another system (one which does not act as a host within the plex).

The software components of FIG. 1 (the host managers, telephony nodes, application nodes, and the plex manager and configuration manager) are all Java programs in the preferred embodiment, with each node running on a separate Java Virtual Machine (JVM). Thus the present architecture can be deployed on any system for which Java support is available. As will be described in more detail later, the applications that run within the nodes are typically constructed from Java Beans (Java Beans are Java components supporting certain standard interfaces that allow them to be easily assembled into applications using general program development tools, such as IBM VisualAge for Java, available from IBM Corporation). The applications talk to the telephony node using the Java Remote Method Interface (RMI); consequently it is effectively transparent to the system whether the application and the telephony node are located on the same host or on different hosts. It is assumed that the reader of the present application is familiar with the Java programming environment; more details about this can be found in "The Java Programming Language, 2nd Edition" by Arnold and Gosling, Addison Wesley, 1998 (ISBN 0-201-31006-6).

It will be appreciated that the particular configuration shown in FIG. 1 is exemplary only, and that many variations are possible. Thus the simplest configuration might involve a single host, which includes a single telephony node running one or more application. In more complicated arrangements, multiple hosts can be used, each with one or more nodes. Hosts without telephony hardware can only run application nodes, whilst hosts with telephony hardware can run a telephony node and also one or more application nodes if so desired (at present a telephony node must reside on the same host as its associated telephony hardware because the interface into the voice processing software 50 from the telephony node generally can only be exploited from the machine which is actually running the voice processing software 50; in the longer term this limitation may be removed, and it might no longer be necessary to tie the telephony node to the same host as its associated telephony hardware). Note that it is possible to run two or more telephony nodes on a single system; in general this requires the line resources of the telephony hardware to be allocated between the different telephony nodes as part of the configuration, in order to avoid the risk of any future conflict. This approach might be desirable for example in a single host system, where a first telephony node having most lines allocated to it represents the production facility (ie used to support actual business operation), whilst a second telephony node with its separate allocation of lines could provide a development and test environment.

Figure 4:
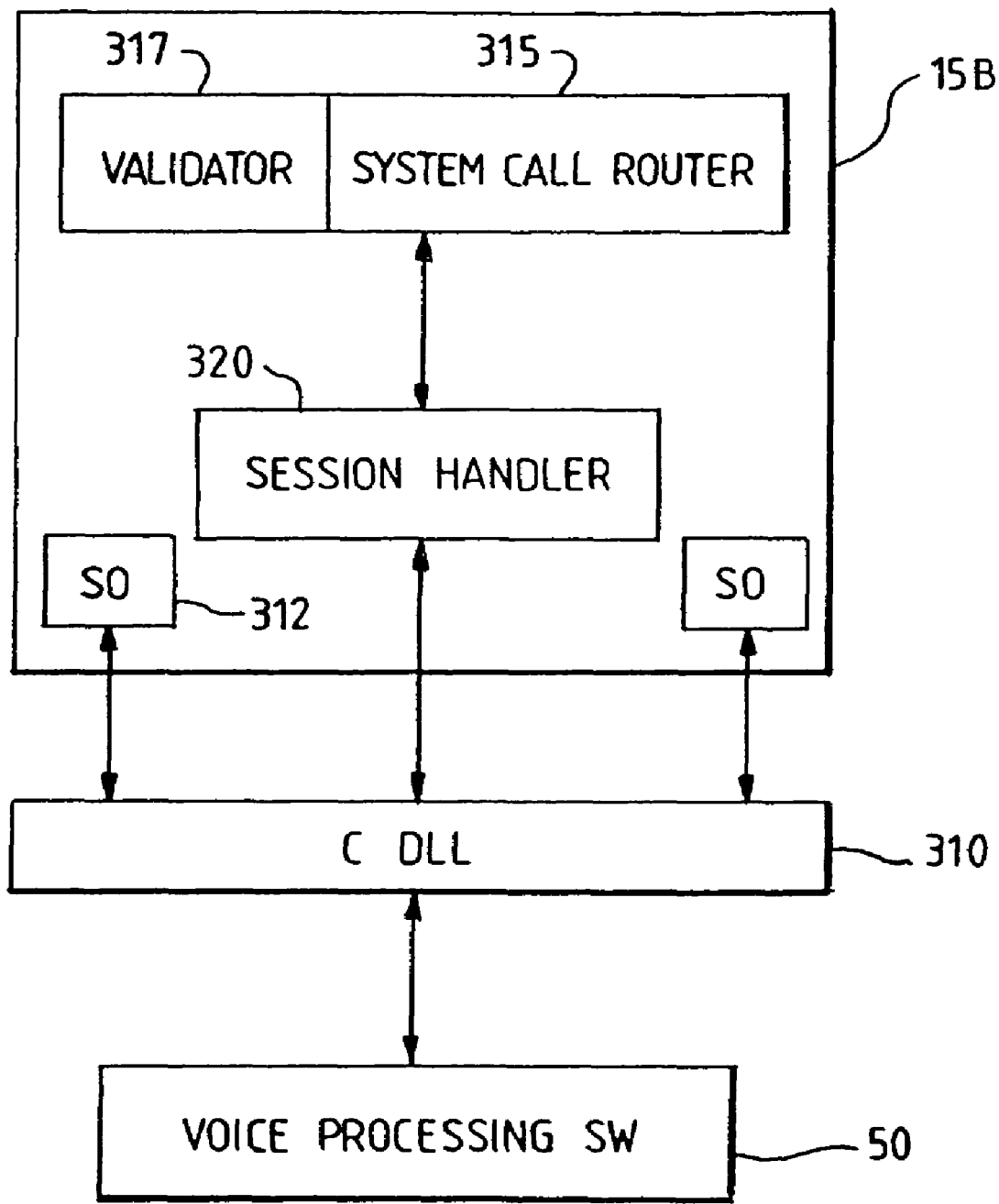
FIG. 4 illustrates the interaction between a telephony node and the voice processing software in the voice processing complex of FIG. 1.

FIG. 4 illustrates the internal structure of a telephony node 15B in more detail, together with its interaction with the voice processing software 50, for the purposes of call routing within the plex. Thus the main component for handling calls is the system call router (SCR) 315, which is primarily responsible for associating calls with applications. The SCR communicates with the session handler 320, which in one embodiment interacts with the voice processing software 50 via a C dynamic link library (DLL) 310. The session handler uses the Java native method interface for communicating with the C DLL. The session handler invokes session objects 312 essentially representing line objects, which perform actions in relation to that line, for example, notification of incoming calls, outbound dialling, playing a prompt, and so on.

Although the SCR is generic across all voice processing systems, the session handler and its associated session objects are specific to the particular voice processing software 50 being used by that telephony node. Thus when the telephony node is first started up, the correct session handler for that hardware on that host is invoked. In one preferred embodiment, where the voice processing software comprises DirectTalk/2, then the session handler interacts with the voice processing software via a C DLL which in turn uses the standard C program application programming interface of DirectTalk/2 to access desired telephone functionality (as described in the above-mentioned manuals). Where the voice processing software comprises DirectTalk for AIX, then the telephone node interacts with the voice processing software via a TCP/IP socket interface (using a datagram between the session handler and the channel processor in DirectTalk for AIX, and a stream between each session object and the corresponding channel process—see U.S. Pat. No. 5,367,609 and U.S.

Pat. No. 5,668,854 for a description of the structure of Direct-Talk for AIX. Note that in this case there is no requirement for a separate C DLL).

The basic purpose of the SCR is to link calls to applications, and it maintains a list for mapping incoming lines to applications (trunk 120 comprises multiple telephony lines). In general, the applications are running prior to the existence of the call, and effectively register (bind) with the SCR. Therefore, when an incoming call is received, the voice processing software notifies the session object 312, which in turn notifies the SCR. The SCR can then link the incoming call to the appropriate application as per the mapping list. If no instances of the specified application are available, or alternatively if no application is specified for that line, then the SCR launches a default application. Note that when a default application is launched, it immediately looks to see if there are any calls waiting to be handled by the default application, and if so puts a request into the SCR to bind it to such a call. This ensures that calls are quickly passed to the default application, even if there is no suitable application running just at the moment when the call is actually received into the system (it is also possible to start up one or more copies of the default application at initialisation time in the same way as described above for a general application).

Thus registering or binding of an application for an inbound call essentially involves submitting a request to the SCR and going into a wait condition until a call is received (subject to a possible time limit). Outbound calls are handled in an essentially analogous fashion, in that again the application requests a call from the SCR, and then waits for such a call to be available (the application may specify that it requires the outbound call immediately, with a failure return should this not be possible).

Applications can also perform a transfer or hand-off, effectively passing a call which they are currently processing back to the SCR, and at the same time specifying another application to which the call should be forwarded. This second application can also perform a transfer if so desired, and so on multiple times. Once an application has completed processing a call, then it returns the call to the SCR. The SCR then either passes the call back to an application from which it was previously transferred (if this was requested at the time of the original transfer), or else terminates the call (ie effectively puts the phone down).

Attached to the SCR is a validator 317. The purpose of this is to try to reclaim telephony resources from badly behaved (or disconnected applications). For example, one process performed by the validator is to review which telephone lines have been assigned to which application, and then to contact the application manager associated with that application. If such contact is unsuccessful (perhaps due to a failure of the network 20 between the application node and the telephony node), then the telephony resource is reclaimed, since in such a situation the application is unable to properly control operations of the telephone line.

The initialisation of the plex is as follows. It is assumed that the host manager 55 is running on each host 10, and likewise that the voice processing software 50 is already running on the host or hosts which include telephony hardware 30. These programs are effectively dormant until activated by the plex manager 200, which is responsible for putting the plex into operation. Thus the plex manager accesses the configuration data 205, and then calls appropriate methods in the various host managers in order to activate the plex (it will be appreciated that the identities and addresses of the host managers, plus all the other information required by the plex manager, is obtained from the configuration data). Thus each host receives information specifying its own name in the system, plus node configuration information. This node configuration information includes the node name, which groups of applications to start (groups of applications can only be started at initialisation; subsequently applications must be started individually), the default host and node name for the telephony node for applications in that node, and whether or not that node is a telephony node. If this is indeed the case (ie the node is a telephony node), then the node configuration information further includes which telephony channels on trunk 120 are to be regarded as inbound or outbound (or either), the mapping of the various lines or channels to the applications, and the name of the default application for use by the node.

Each host manager can then launch an application manager for each node that it supports in accordance with the relevant configuration information (an application manager effectively defines a node). The application manager then starts up the applications in the specified groups, which then register as appropriate with the telephony node. At this point the plex is now ready for operation.

An important feature of the application is that it supports both "managed" and "non-managed" applications. Thus as so far described, applications are effectively subservient to the plex manager, or more generally, to the overall voice processing system, in that such applications are initialised by the plex manager, and generally continuously with the voice processing complex. These are termed "managed" applications.

However, in some cases this is not desirable, since the application might perhaps be much bigger than simply a voice processing application, performing many other business functions as well. As an example, such an application might need at selected times to make outbound calls (perhaps to transmit FAXes). The architecture of FIG. 1 supports this via "unmanaged" applications. These are applications which initially exist outside the structure of FIG. 1, but nevertheless still desire to access and exploit the telephony hardware by making the appropriate calls into a telephony node. The manner in which unmanaged applications are supported will be described in more detail below.

If we now consider the formation of an application, a set of telephony Java Beans are provided to allow voice processing functionality to be easily incorporated into Java applications. The main types of beans provided are as follows:

Telephone: allows an application to perform simple telephony functions, ie request an inbound or outbound call and terminate a call;

Menu: allows a voice processing menu to be presented to the caller; includes one or more Menu Item beans;

Form: allows a voice processing form to be presented to the caller for completion; includes one or more Entry Field beans, as well as Menu, Menu Item and other beans as required;

Announcement: plays an audio message to the caller;

Voice Recorder: records an audio message from the caller;

Media: effectively represents output data (generally audio), including certain predefined beans, such as AudioDate, AudioTime, AudioCurrency, Number and Prompt (representing a sequence of media objects), plus also DTMFsequence, which plays a sequence of specified DTMF keys to the caller.

The operation of a very simple application will now be discussed in detail in conjunction with FIG. 5 to illustrate the operation of the voice processing system. The purpose of this application is to answer a call, prompt the caller with a question, collect one or more DTMF digits, and then terminate the call (for example to register a contribution in a telephone poll), using the telephony service provided by telephone node 15B. Thus an application 40 is initially launched by the application manager 500 as previously described (it will be appreciated that in FIG. 5 the architecture described herein allows either the application manager 500 to be inside the telephony node 15B if the application is also running in this node, or else the application manager and application might perhaps form a separate node from telephony node 15B).

Responsive to a telephone object 405 included in the application, the application first inquires from the application manager the location of the telephony node for it to use (unless this has been deliberately hard-coded into the application in advance). This approach allows the same application to be used on essentially any host. The application then binds itself with the SCR 315 as discussed above via the application manager, and waits for an incoming call on a line mapped to that application.

An important aspect of this process is that the telephone object initially accesses the application manager via its static interface, rather than via a direct method call. The implication of this is that if no application manager is currently running on that system, then one is launched by the Java environment. This therefore provides a mechanism for un-managed applications as mentioned above to gain access to the voice processing system, by utilising a telephone bean to start an application manager for this purpose. Note that in such an eventuality, the application manager does not have certain configuration information, such as the default telephony node which it normally receives as part of the initialisation process from the plex manager. Therefore the telephone bean must know and provide the full address of a suitable telephone node when it makes a call into the application manager.

It will be appreciated that when a managed application makes a call to the static interface of the application manager which launched it, then this application manager is already instantiated. In these circumstances, the static call is analogous to a direct call onto a method of this object.

Note that the ability to support both managed and un-managed applications via the same interface provides another mechanism to support production applications as well as development applications on the same system, with the former being handled as managed applications which are brought up with the system, and the latter being handled as un-managed applications, which are only operated periodically for testing purposes. In this situation, the only modification that needs to be made to an application as it goes from development to production is that it will (typically) then rely on the default telephony node, rather than having this specified in the application itself.

Figure 5:
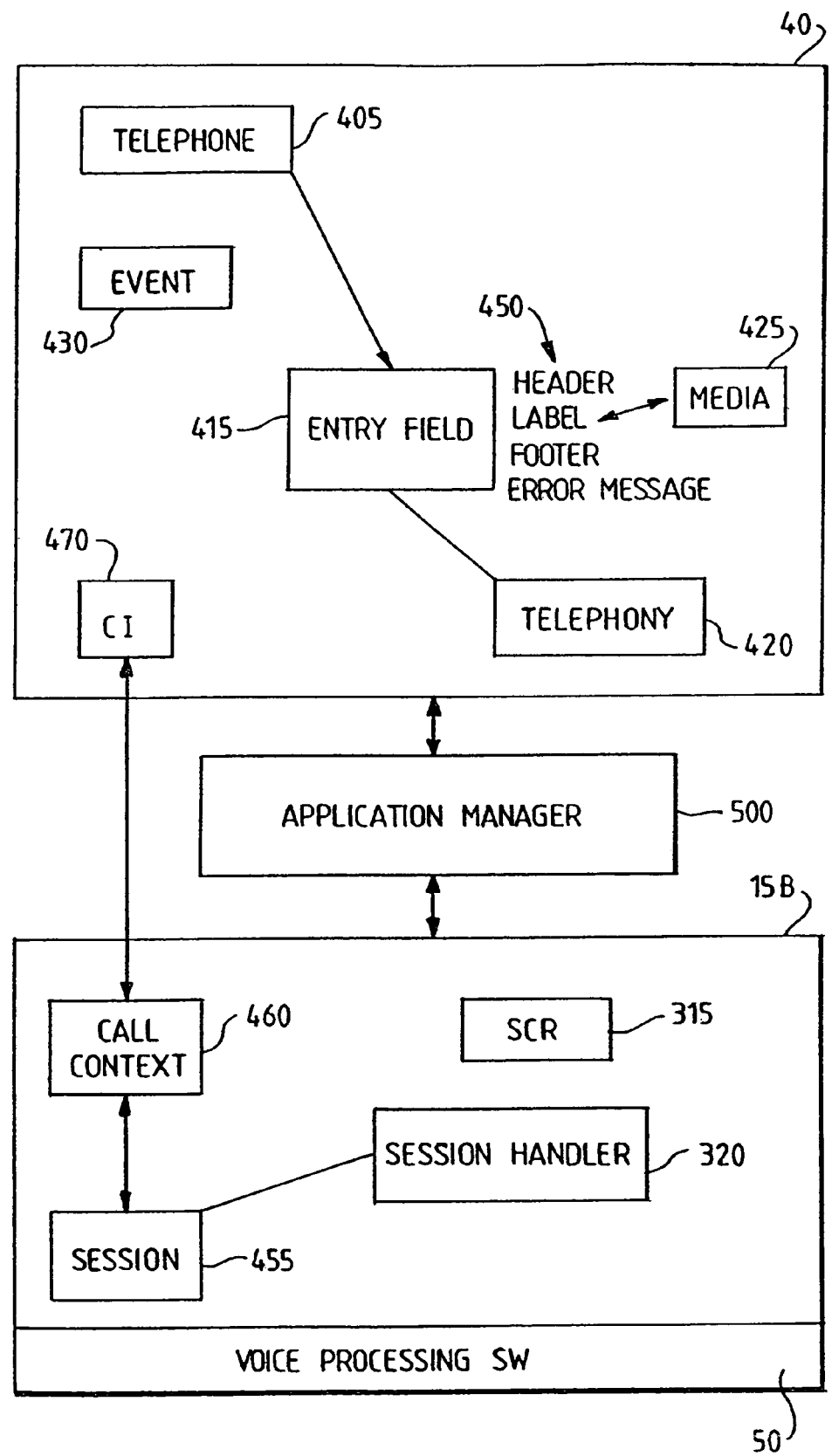
FIG. 5 illustrates the interaction between an application and a telephony node in the voice processing complex of FIG. 1.

Returning now to the process of FIG. 5, once a call has been received on a particular line, this is notified by the session object 455 for that line to the session handler, which first creates a call context 460. This effectively represents a call object, and can interact with the relevant session object for the line on which the call is present to perform actions such as playing a prompt, and receiving a DTMF key input. Next, the session handler makes a call into the SCR 315 to notify the application of the call. This results in the SCR passing back the identity of the call context object 460 to telephone bean 405 (essentially as a return code to the original registration call) via the application manager 500, and the building of a connection item object 470, which is subsequently used by the application to talk to the call context 460 and so to access the desired telephony functionality.

In the example application shown in FIG. 5, the telephone bean 405 is succeeded by an Entry Field object 415. Thus after the telephone bean has duly received an incoming telephony call, it passes an event object 430 to the entry field object 450, the event object including a reference to the connection item 470.

The entry field object is enabled to play a message to the caller, which can in the preferred embodiment consist of three components, a header, a label, and a footer. Each component represents a property 450 of the Entry Field object, and during application development is associated with a media bean or object 425 (nb the header and footer are optional). Such a media object represents a pre-recorded audio (voice) segment, an audio message to be generated (eg for the date or time), or an assemblage of these (a media object can also play out a sequence of DTMF keys). Each voice segment is assigned a name and category for identification purposes. A media type object can also be supplied with information from the entry field object concerning locale and organisation (which the entry field can retrieve where not already specified from the application manager); defaults can be used where desired. This information can then be utilised for example to determine a header voice segment appropriate for that organisation, thereby allowing applications (such as voice mail) to be easily customised and deployed by or for a variety of organisations. The use of the locale is described in more detail below. Note that the same pattern regarding organisation, locale, etc is used with the other beans, such as Announcement, Menu, and so on.

The entry field object then utilises the connection item 470 to play out a prompt over the telephone line and to retrieve a DTMF input via RMI on the call context 460. As part of this process, the entry field combines its header, label and footer as applicable into a prompt media object, which is then serialised and also passed to the call context.

The call context then calls a mapping method in the (prompt) media object, which effectively parses the media object to produce a string of output primitives. For simple voice segments, these are indicated by a reference to the appropriate voice segment as provided by the underlying voice processing software 50. For example, whilst most voice processing systems might provide "Hello" as a pre-recorded voice segment, this will have a different identifier in the different systems. The voice application environment of the present invention provides a platform independent listing of voice segments, which then needs to be mapped at this stage to the corresponding actual voice segments as supported on the telephony node 15B which is actually handling the call. Thus the prompt is mapped into an equivalent sequence of voice segments which can be passed through the session object 455 to be played over the line by voice processing software 50. Responsive to this prompt, a DTMF key input can be received, and passed back to the entry field object via the call context and connection item. The entry field item can if desired validate this input (for example confirming that the caller has entered the correct number of digits), and if not play the error message 430 to the caller in the same way that the label provided the caller with the original prompt. Once a valid input has been received, control then passes to telephony bean 420, which makes a return call to the SCR in order to terminate the telephone call. At this stage the application may also desire to process the caller input, for example by using a bean (not shown) to save the received DTMF key in a database.

If we consider the mapping operation in a little more detail now, this involves the media object calling a method in a mapper class (not shown); effectively the media object passes itself into this mapper class. The mapping operation must perform some additional processing for media objects which do not correspond directly to simple voice segment primitives, but rather represent assemblages of these. For example, an audio time for 12:32 am might need to be formed from three separate voice segments: "twelve", "thirty-two", "am" (note that the mapping process will provide the current data/time or whatever for such objects unless some other value is particularly specified). In similar fashion, each prompt bean will be broken down first into its constituent media objects (voice segment, Audiodate, and so on), and then into voice segment primitives. For certain media beans different styles are available. For example, for AudioTime, this can be presented either using a twelve hour clock, or using a twenty-four hour clock. An application developer can therefore specify a style with such an object, and this in turn will determine the particular method call in the mapper class to perform the mapping operation.

The present system also supports locale-specific rendition of audio output, where the locale typically represents the language and country of operation. The locale can either be specified by the application as part of the relevant request into the call context, or a default value can be used, which is picked up by the call context from the Java environment, and is passed into the media object as a parameter when invoked by the call context object. For direct mapping of voice segments, the locale can be used as an additional identifier, which may be useful when developing multilingual applications. Thus an application might perhaps start by playing the announcement "Welcome to the European Patent Office", repeated in the three official languages of the EPO (French, German, English). There would therefore be three recordings of this phrase corresponding to the three languages, which could then be stored under same name and category, but at different locales (in this case the application would need to formally specify the locale for at least two of the languages).

For more complex objects, the locale is used to determine the mapper class invoked to perform the mapping operation. In the preferred embodiment, the locale specific name of each mapper class has three components (say <xx>_<yy>_<zz>), where typically <xx> is used to specify language (eg English), <yy> country (eg US—this can then be used to pick out a country specific form of the language such as US English), and <zz> to specify further local variation, this latter option representing a straightforward mechanism for an application developer to alter the default audio rendering. Note that as part of the mapping method, the media object looks firstly for a mapper class with a match of all three locale components; if this cannot be found, it looks for a class that simply specifies the correct first two components, then for a class that simply specifies the correct first component, and finally for a class that matches without any locale components. Therefore the mapping process behaves as reasonably as possible, even if no locale-specific behaviour is specified, and reflects the need to decouple the application from needing to know about the future locale in which it will operate (thereby allowing a truly generic application to be developed).

Note that the default style methods can vary from one mapper class to another, as dependent on locale. This allows, for example, an AudioDate to be formatted differently (by default) in the US as opposed to the UK (Month-day-Year as against Day-Month-Year).

Although the embodiment described herein has focused primarily on the basic voice processing operations of playing voice segments and receiving DTMF input, it will be appreciated that such a voice processing system can be easily extended to provide more advanced functionality, as supported by the underlying telephony hardware. For example, voice applications are now starting to use text to speech (TTS) and voice recognition for input and output respectively. In the former case, a media type object might indicate whether or not the mapping process should use TTS (if available from the telephony node), should a requested voice segment not be available in prerecorded format. Similarly, an EntryField object can specify whether or not its input can be collected utilising voice recognition as an alternative to DTMF input, and the call context can process this accordingly.

The invention claimed is:

1. A voice processing system for connection to at least one telephone line for providing telephony functionality to one or more voice processing applications, said voice processing system comprising:
   first application manager means for launching one or more first voice processing applications when the voice processing system is initialised, each said first voice processing application comprising a media object and said media object comprising means for outputting a set of plurality of output components in accordance with one or more presentation criteria, said application manager means providing access to said telephony functionality for said one or more first voice processing applications;
   second application manager means which is launched responsive to a request by a second voice processing application for access to said telephony functionality;
   telephony hardware for providing access to a plurality of telephone lines;
means for maintaining a mapping of said voice applications to said telephone lines;
means for creating a call object in response to an incoming call on one of said plurality of telephone lines;
   means for determining one of said first or second voice processing applications to be associated with said incoming call on the basis of said mapping of said voice applications to said telephone lines;
   means for providing an identifier for said call object to the determined voice application; and
   means in said call object responsive from said determined voice application for receiving said output components in accordance with said one or more presentation criteria and outputting said output components over said telephone lines.

2. The voice processing system of claim 1, wherein said first and second application manager means each support the same static interface through which said first and second voice processing applications obtain access to telephone functionality.

3. A voice processing system for connection to at least one telephone line for providing telephony functionality to one or more voice processing applications, said voice processing system comprising:
   first application manager means for launching one or more first voice processing applications when the voice processing system is initialised, each said first voice processing application comprising a media object and said media object comprising means for outputting a set of plurality of output components in accordance with a presentation criterion of locale, said application manager means providing access to said telephony functionality for said one or more first voice processing applications;
   second application manager means which is launched responsive to a request by a second voice processing application for access to said telephony functionality;
   telephony hardware for providing access to a plurality of telephone lines;

means for maintaining a mapping of said voice applications to said telephone lines;

means for creating a call object in response to an incoming call on one of said plurality of telephone lines;

means for determining one of said first or second voice processing applications to be associated with said incoming call on the basis of said mapping of said voice applications to said telephone lines;

means for providing an identifier for said call object to the determined voice application; and means in said call object responsive from said determined voice application for receiving said output components in accordance with said presentation criteria of locale and outputting said output components over said telephone lines.

4. The system of claim 3 wherein said presentation criterion of locale represents the language an country of operation.

5. The system of claim 3 wherein said presentation criterion of locale is configured to determine a mapper class invoked to perform a mapping operation.

6. A voice processing system for connection to at least one telephone line for providing telephony functionality to one or more voice processing applications, said voice processing system comprising:

first application manager means for launching one or more first voice processing applications when the voice processing system is initialised, each said first voice processing application comprising a media object and said media object comprising means for outputting a set of plurality of output components in accordance with said presentation criteria of style, said application manager means providing access to said telephony functionality for said one or more first voice processing applications;

second application manager means which is launched responsive to a request by a second voice processing application for access to said telephony functionality;

telephony hardware for providing access to a plurality of telephone lines;

means for maintaining a mapping of said voice applications to said telephone lines;

means for creating a call object in response to an incoming call on one of said plurality of telephone lines;

means for determining one of said first or second voice processing applications to be associated with said incoming call on the basis of said mapping of said voice applications to said telephone lines;

means for providing an identifier for said call object to the determined voice application; and means in said call object responsive from said determined voice application for receiving said output components in accordance with said presentation criteria of style and outputting said output components over said telephone lines.

7. The system of claim 6 wherein said presentation criterion of style corresponding to a style option in a media beans.

8. The system of claim 6 wherein said presentation criterion of style specifies of the following: a twelve hour clock, or a twenty-four hour clock.

* * * * *

UNITED STATES PATENT AND TRADEMARK OFFICE
CERTIFICATE OF CORRECTION

PATENT NO. : 7,660,399 B2
APPLICATION NO. : 10/818837
DATED : February 9, 2010
INVENTOR(S) : Borman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1069 days.

Signed and Sealed this

Thirtieth Day of November, 2010

David J. Kappos
*Director of the United States Patent and Trademark Office*